US007474671B2

(12) United States Patent
Liang et al.

(10) Patent No.: US 7,474,671 B2
(45) Date of Patent: Jan. 6, 2009

(54) SYSTEM AND METHOD FOR RESOLVING CONTENTION AMONG APPLICATIONS REQUIRING DATA CONNECTIONS BETWEEN A MOBILE COMMUNICATIONS DEVICE AND A WIRELESS NETWORK

(75) Inventors: Kenneth Liang, Kanata (CA); Mahmud-Ul Hassan, Kanata (CA); Colin Ho, Kanata (CA)

(73) Assignee: Research In Motion Limited, Waterloo (CA)

( * ) Notice: Subject to any disclaimer, the term of this patent is extended or adjusted under 35 U.S.C. 154(b) by 470 days.

(21) Appl. No.: 11/267,538

(22) Filed: Nov. 4, 2005

(65) Prior Publication Data

US 2007/0104158 A1    May 10, 2007

(51) Int. Cl.
*H04J 3/02* (2006.01)
*H04Q 7/20* (2006.01)
(52) U.S. Cl. ............... 370/462; 455/452.1; 455/452.2; 455/435.2; 455/435.3
(58) Field of Classification Search ............... 370/462; 455/452.1, 452.2, 435.2, 435.3
See application file for complete search history.

(56) References Cited

U.S. PATENT DOCUMENTS

| 2004/0023646 A1* | 2/2004 | Inami et al. ............... 455/418 |
| 2004/0052212 A1 | 3/2004 | Baillargeon |
| 2004/0209643 A1* | 10/2004 | Welsh .................... 455/556.1 |
| 2005/0070290 A1* | 3/2005 | Baggstrom et al. .......... 455/445 |

FOREIGN PATENT DOCUMENTS

WO    WO 2004/061638 A2    7/2004

OTHER PUBLICATIONS

European Search Report; European Patent Office; Mar. 20, 2006; 6 pages.
Xu et al.; "QoS and Contention-Aware Multi-Resource Reservation"; 2000; IEEE; pp. 3-10. Dec. 2000.
"Digital Cellular Telecommunications System (Phase 2+); Universal Mobile Telecommunications System (UMTS); General Packet Radio Service (GPRS); Service Description; Stage 2 (3GPP TS 23.060 version 6.8.0 Release 6)"; Mar. 2005; Technical Specification; pp. 1-212.
"Digital Cellular Telecommunications System (Phase 2+); Universal Mobile Telecommunication System (UMTS); Mobile Radio Interface Layer 3 Specification; Core Network Protocols; Stage 3 (3GPP TS 24.008 version 6.8.0 Release 6)"; Mar. 2005; Technical Specification; pp. 1-518.
European Search Report; European Patent Office; Apr. 14, 2008; 7 pages.

* cited by examiner

*Primary Examiner*—Barry W Taylor
(74) *Attorney, Agent, or Firm*—The Danamraj Law Group, P.C.

(57) ABSTRACT

A mobile communications device (30) includes a wireless transceiver (34) operable to conduct at least two data connections between the mobile communications device (30) and a wireless network (12) wherein each of the data connections is associated with a connected application operating on the mobile communications device. A processor (32) is coupled to the wireless transceiver (34). The processor (32) is operable to process a request for a data connection for an unconnected application operable on the mobile communications device (30), to release one of the data connections associated with one of the connected applications and to establish a data connection between the mobile communications device (30) and the wireless network (12) for the unconnected application. A contention manager (86) is operable to select the connected application to be released based upon a comparison of a contention parameter associated with each of the connected applications.

21 Claims, 5 Drawing Sheets

SYSTEM AND METHOD FOR RESOLVING CONTENTION AMONG APPLICATIONS REQUIRING DATA CONNECTIONS BETWEEN A MOBILE COMMUNICATIONS DEVICE AND A WIRELESS NETWORK

TECHNICAL FIELD OF THE APPLICATION

The present disclosure relates, in general, to communications sessions between mobile communications devices and wireless packet data service networks and, in particular, to a system and method for resolving contention among applications operating on a mobile communications device that require data connections to a wireless packet data service network.

BACKGROUND

It is becoming commonplace to use wireless packet data service networks for effectuating data sessions with mobile communications devices. For example, a mobile communications device may be used to provide certain high priority data services such as wirelessly extending a corporate email account, personal information manager or the like. Similarly, the same mobile communications device may also be used to provide other lower priority data services such as messenger applications, web browsing or the like. As many of these applications require a continually active data connection or constant connectivity, it has been found that only a limited number of such applications can operate at the same time on a typical mobile communications device. Accordingly, a need has arisen for a system and method for resolving contention among applications operating on a mobile communications device that require data connections to a wireless packet data service network.

BRIEF DESCRIPTION OF THE DRAWINGS

For a more complete understanding of the features and advantages of the present method and mobile device, reference is now made to the detailed description along with the accompanying figures in which corresponding numerals in the different figures refer to corresponding parts and in which.

DETAILED DESCRIPTION OF THE DRAWINGS

While various embodiments of a mobile communications device operating within a network system are discussed in detail below, it should be appreciated that the present disclosure provides many applicable inventive concepts which can be embodied in a wide variety of specific contexts. The specific embodiments discussed herein are merely illustrative of specific ways to use the mobile communications device within the network system, and do not delimit the scope of the present disclosure.

Disclosed herein are methods and systems for resolving contention between applications operable on a mobile communications device that require data connections to a wireless packet data service network. Broadly, the technique involves executing a contention manager routine on the mobile communications device that is operable to select which of the applications currently conducting data sessions should release its data session in favor of an application currently requesting a data session.

In one aspect, a method for resolving contention among applications operable on a mobile communications device involves conducting at least two data connections between the mobile communications device and the wireless network, each of the data connections associated with a connected application operating on the mobile communications device, requesting a data connection for an unconnected application operable on the mobile communications device, releasing one of the data connections responsive to the request, the releasing including selecting one of the connected applications by a contention manager based upon a comparison of a contention parameter associated with each of the connected applications and releasing the data connection associated with the selected connected application and then establishing the data connection between the mobile communications device and the wireless network for the requesting unconnected application.

In one embodiment, the least two data connections between the mobile communications device and the wireless network represent the maximum number of data connections allowed by the mobile communications device. In another embodiment, the at least two data connections between the mobile communications device and the wireless network represent the maximum number of data connections allowed between the mobile communications device and the wireless network. In a further embodiment, each of the applications is an application requiring constant connectivity.

The method may utilize a variety of contention parameters to determine which of the connected applications should release its data connection. For example, the contention parameters may include application priority, data traffic, duration of current connection and the like. The method may utilize a single contention parameter or a group of contention parameters which may be analyzed by the contention manager either in series or parallel.

In another aspect, a mobile communications device includes a wireless transceiver operable to conduct at least two data connections between the mobile communications device and a wireless network wherein each of the data connections is associated with a connected application operating on the mobile communications device. A processor is coupled to the wireless transceiver and is operable to process a request for a data connection for an unconnected application operable on the mobile communications device, to release one of the data connections associated with one of the connected applications and to establish a data connection between the mobile communications device and the wireless network for the unconnected application. A contention manager is operable to select the connected application to be released based upon a comparison of a contention parameter associated with each of the connected applications.

In a further aspect, a computer program product includes a storage medium and computer instructions stored in the storage medium. The computer instructions are executable by a processor of a mobile communications device that is operable to conduct at least two data connections with a wireless network. Each of the data connections is associated with a connected application operating on the mobile communications device. The computer instructions resolve contention among applications operable on the mobile communications device by receiving a request for a data connection for an unconnected application operable on the mobile communications device, selecting one of the connected applications based upon a comparison of a contention parameter associated with each of the connected applications, releasing the data connection associated with the selected connected application and establishing the data connection between the mobile communications device and the wireless network for the unconnected application.

Figure 1:
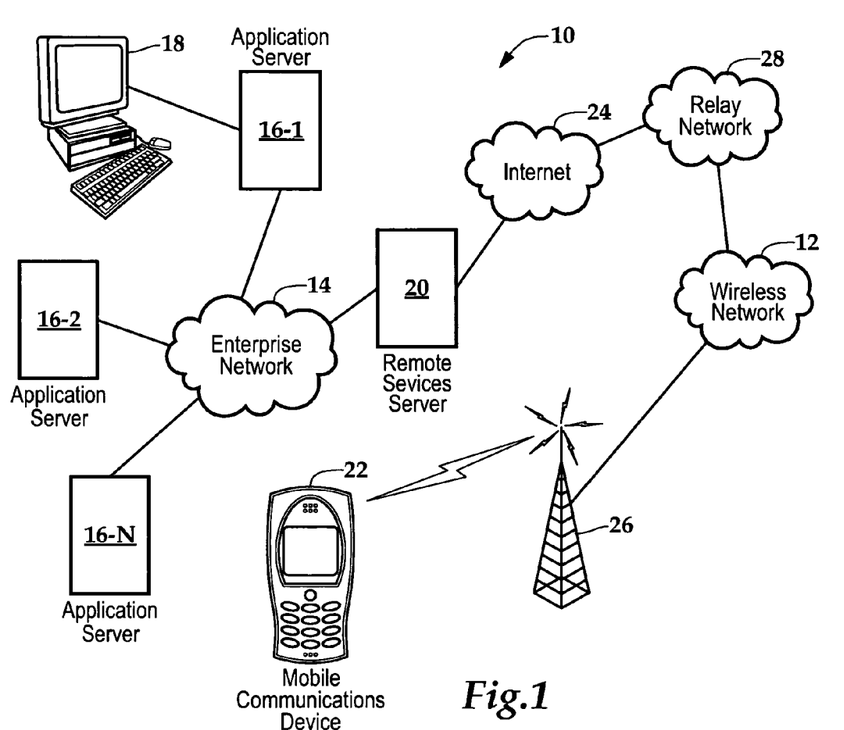
FIG. 1 depicts an exemplary network environment including a wireless packet data service network wherein an embodiment of the present method may be practiced.

Referring now to the drawings, and more particularly to FIG. 1, depicted therein is an exemplary network environment 10 including a wireless packet data service network 12 wherein an embodiment of the present method may be practiced. An enterprise network 14 for serving a plurality of corporate users, which may be a packet-switched network, can include one or more geographic sites and be organized as a local area network (LAN), a wide area network (WAN), a metropolitan area network (MAN) or the like. A number of application servers 16-1 through 16-N disposed as part of the enterprise network 14 are operable to provide or effectuate a host of internal and external services such as Internet access, corporate data access, information management and the like as well as certain continually operable data services such as email, video mail, messaging, calendaring, scheduling and the like. Accordingly, a diverse array of personal information appliances 18 such as desktop computers, laptop computers, palmtop computers or the like may be operably networked to one or more of the application servers 16-$i$, $i=1, 2, \ldots, N$, with respect to the services supported in the enterprise network 14.

Additionally, a remote services server 20 may be interfaced with the enterprise network 14 for enabling a corporate user to access or effectuate any of the services from a remote location using a suitable mobile communications device (MCD) 22. A secure communication link with end-to-end encryption may be established that is mediated through an external IP network, i.e., a public packet-switched network such as the Internet 24, as well as the wireless packet data service network 12 operable with MCD 22 via suitable wireless network infrastructure that includes a base station 26. In one embodiment, a trusted relay network 28 may be disposed between the Internet 24 and the infrastructure of wireless packet data service network 12. By way of example, MCD 22 may be a data-enabled handheld device capable of receiving and sending messages, web browsing, interfacing with corporate application servers and the like.

For purposes of the present disclosure, the wireless packet data service network 12 may be implemented in any known or heretofore unknown mobile communications technologies and network protocols, as long as a packet-switched data service is available therein for transmitting packetized information. For instance, the wireless packet data service network 12 may be comprised of a General Packet Radio Service (GPRS) network that provides a packet radio access for mobile devices using the cellular infrastructure of a Global System for Mobile Communications (GSM)-based carrier network. In other implementations, the wireless packet data service network 12 may comprise an Enhanced Data Rates for GSM Evolution (EDGE) network, an Integrated Digital Enhanced Network (IDEN), a Code Division Multiple Access (CDMA) network, a Universal Mobile Telecommunications System (UMTS) network, or any 3rd Generation (3G) network. As will be seen hereinbelow, the embodiments of the present disclosure for resolving contention between applications operable on a mobile communications device that require data connections to a wireless packet data service network will be described regardless of any particular wireless network implementation.

Figure 2:
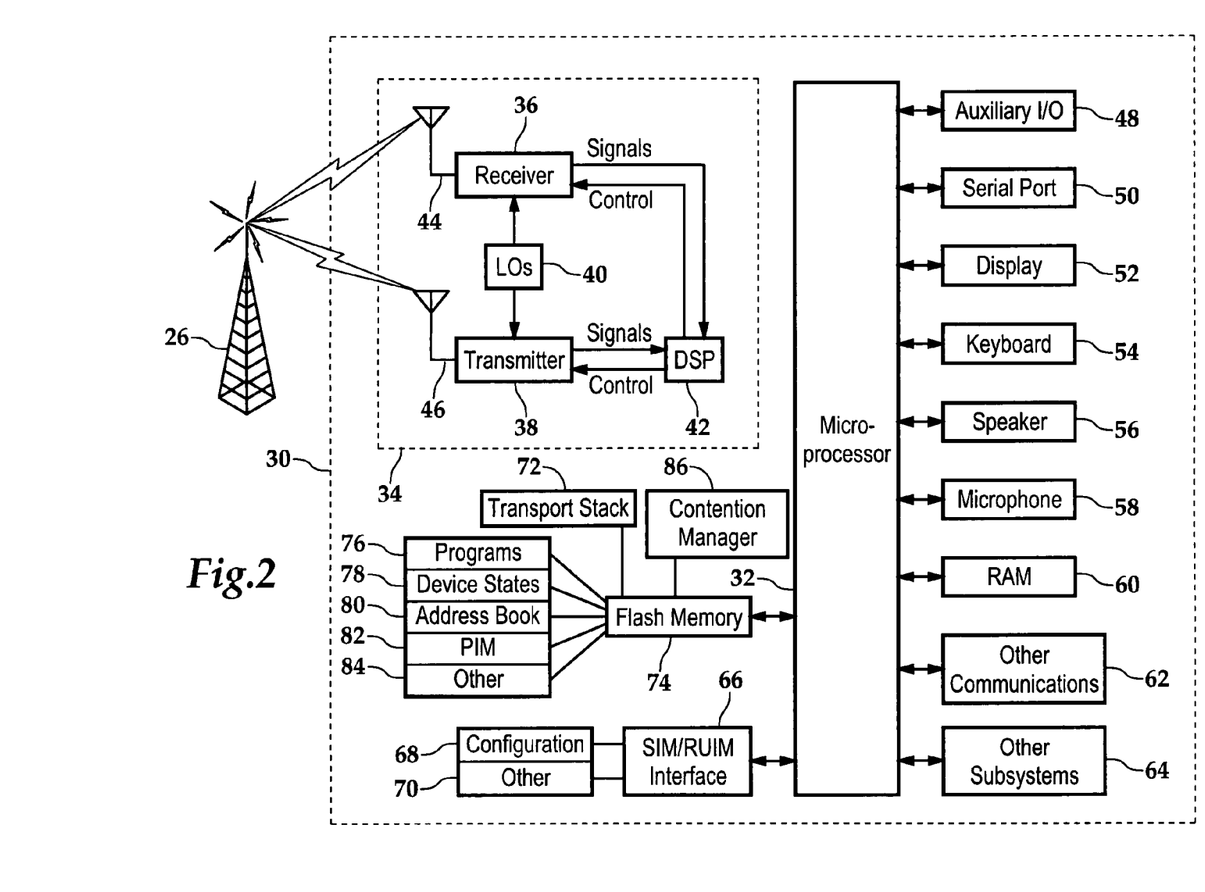
FIG. 2 depicts a block diagram of a mobile communications device according to one embodiment of the present disclosure.

FIG. 2 depicts a block diagram of a mobile communications device that supports continually operable data service and that is generally designated 30. It will be recognized by those skilled in the art upon reference hereto that although an embodiment of MCD 30 may comprise an arrangement similar to one shown in FIG. 2, there can be any number of variations and modifications, in hardware, software or firmware, with respect to the various modules depicted. Accordingly, the arrangement of FIG. 2 should be taken as illustrative rather than limiting with respect to the embodiments of the present disclosure. A microprocessor 32 providing for the overall control of MCD 30 is operably coupled to a communication subsystem 34 which includes a receiver 36 and transmitter 38 as well as associated components such as one or more local oscillator (LO) modules 40 and a processing module such as a digital signal processor (DSP) 42. As will be apparent to those skilled in the field of communications, the particular design of the communication module 34 may be dependent upon the communications network with which the mobile device is intended to operate.

In one embodiment, the communication module 34 is operable with both voice and data communications. Regardless of the particular design, however, signals received by antenna 44 through base station 26 are provided to receiver 36, which may perform such common receiver functions as signal amplification, frequency down conversion, filtering, channel selection, analog-to-digital (A/D) conversion, and the like. Similarly, signals to be transmitted are processed, including modulation and encoding, for example, by DSP 42, and provided to transmitter 44 for digital-to-analog (D/A) conversion, frequency up conversion, filtering, amplification and transmission over the air-radio interface via antenna 46.

Microprocessor 32 also interfaces with further device subsystems such as auxiliary input/output (I/O) 48, serial port 50, display 52, keyboard 54, speaker 56, microphone 58, random access memory (RAM) 60, a short-range communications subsystem 62 and any other device subsystems generally labeled as reference numeral 64. To control access, a Subscriber Identity Module (SIM) or Removable user Identity Module (RUIM) interface 66 is also provided in communication with the microprocessor 32. In one implementation, SIM/RUIM interface 66 is operable with a SIM/RUIM card having a number of key configurations 68 and other information 70 such as identification and subscriber-related data.

Operating system software and software associated with transport stack 72 may be embodied in a persistent storage module (i.e., non-volatile storage) such as flash memory 74. In one implementation, flash memory 74 may be segregated into different areas, e.g., storage areas for computer programs 76, device states 78, address book 80, other personal information manager (PIM) data 82 and other data storage areas generally labeled as reference numeral 84. Additionally, a contention manager logic module 86 is provided for resolving contention among applications operable on MCD 30 that require data connections to wireless packet data service network 12 according to the teachings set forth herein.

Figure 3:
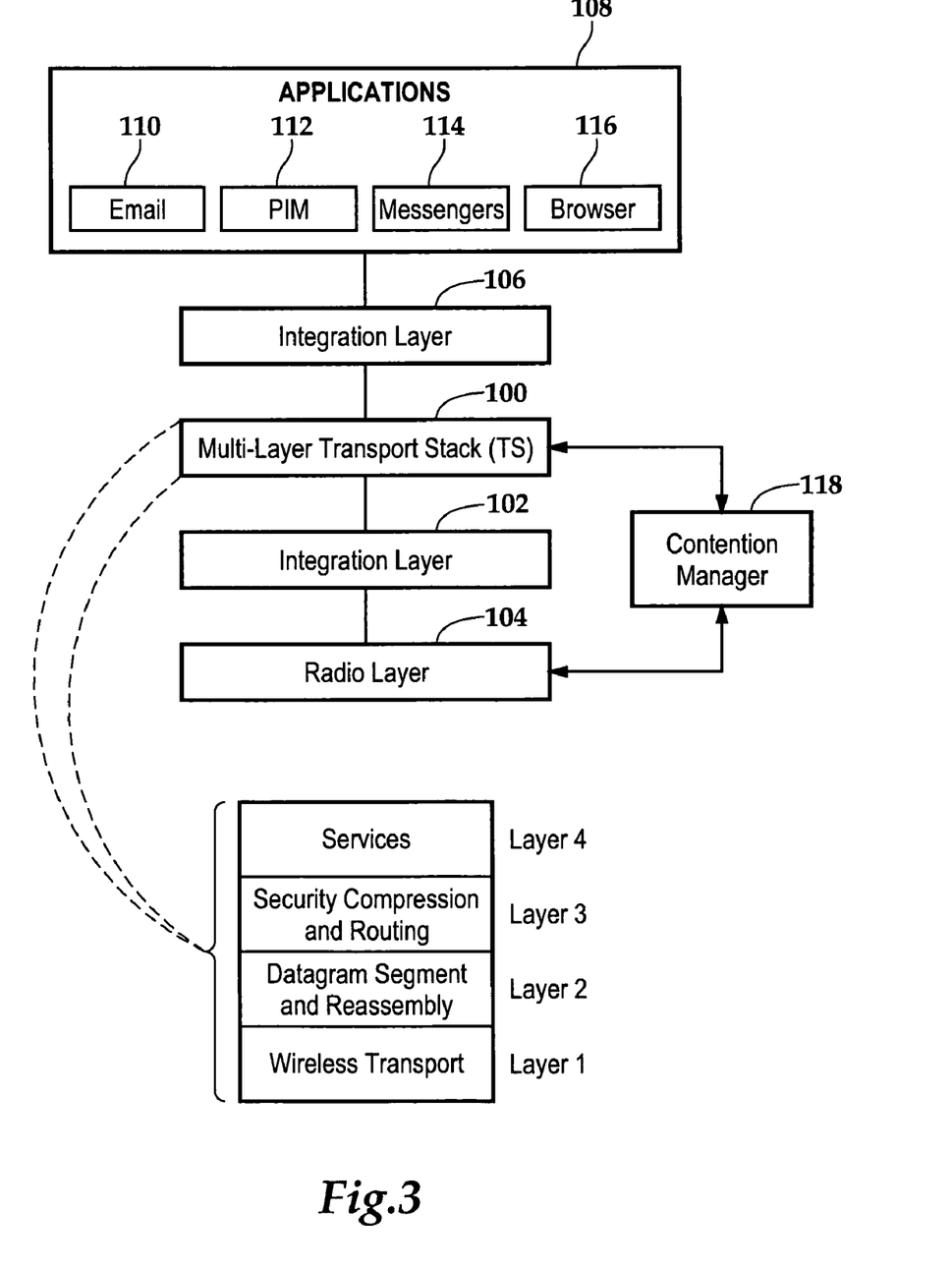
FIG. 3 depicts a software architectural view of a mobile communications device according to one embodiment of the present disclosure.

FIG. 3 depicts a software architectural view of a mobile communications device operable according to one embodiment for regulating and scheduling application access to communications sessions with wireless packet data service network 12 regardless of the manufacturer of the MCD or the wireless service provider. A multi-layer transport stack (TS) 100 is operable to provide a generic data transport protocol for any type of corporate data, including email, via reliable, secure and seamless continuous connections to a wireless packet data service network. As illustrated in the embodiment of FIG. 3, an integration layer 102 is operable as an interface between the MCD's radio layer 104 and the transport stack 100. Likewise, another integration layer 106 is provided for interfacing between the transport stack 100 and the user applications 108 supported on the MCD, e.g., email 110, personal information manager (PIM) 112 including calendaring, scheduling, contacts and the like, messengers 114, web browser 116 and the like. Although not specifically shown, the transport stack 100 may also be interfaced with the MCD's operating system. In another implementation, the transport stack 100 may be provided as part of a data communications client module operable as a host-independent virtual machine on a mobile device.

The bottom layer (Layer 1) of the transport stack 100 is operable as an interface to the wireless network's packet layer. Layer 1 handles basic service coordination within the exemplary network environment 10 shown in FIG. 1. For example, when an MCD roams from one carrier network to another, Layer 1 verifies that the packets are relayed to the appropriate wireless network and that any packets that are pending from the previous network are rerouted to the current network. The top layer (Layer 4) exposes various application interfaces to the services supported on the MCD. The remaining two layers, Layer 2 and Layer 3, are responsible for datagram segmentation/reassembly and security, compression and routing, respectively.

FIG. 3 also depicts a contention manager logic module 118 provided as part of the MCD's software environment that is disposed in operable communication with the transport stack 100 and radio layer 104 as well as the OS environment for regulating and scheduling application access to communications sessions with wireless packet data service network 12. In one implementation, contention manager logic module 118 is operable to select a data connection for release based upon contention parameters associated with each of the connected applications. For example, when the maximum number of data connections allowed by the MCD or between the MCD and the wireless packet data service network 12 has been reached and an unconnected application is requesting a data connection, contention manager logic module 118 determines which of the connected application should release its data connection in favor of the requesting unconnected application.

For purposes of illustration, a particular MCD is capable of having two simultaneous data connections and is currently conducting a data session for messenger application 114 and a data session for email application 110. The user of the MCD now attempts to launch browser application 116. As the present MCD can only have two simultaneous data connections, the MCD is not able to open a new data session for browser application 116 without first releasing one of the active data sessions from either messenger application 114 or email application 110. Contention manager logic module 118 determines which of the two applications should release its data connection and then establishes a data connection for browser application 116. Specifically, contention manager logic module 118 uses one or more contention parameters associated with either the connected applications, in this case messenger application 114 and email application 110, or the data connections associated with the connected applications to determine which data connection to release. In one embodiment, contention manager logic module 118 may use application priority as the contention parameter. In the present example, as email application 110 is intended to be an "always on" application, email application 110 has a high priority. On the other hand, messenger application 114 is of a low priority. As such, using the contention parameter of application priority, contention manager logic module 118 selects messenger application 114 to release its data connection. Thereafter, the data connection for browser application 116 can be established.

Continuing with the present example and assuming the MCD is currently conducting a data session for messenger application 114 and a data session for browser application 116, email application 110 now requests a data connection either due to a user input or due to an automatic attempt to reestablish a data connection. As above, the MCD is not able to open a new data session for email application 110 without first releasing one of the active data sessions from either messenger application 114 or browser application 116. In this case, the application priority is low for both messenger application 114 and browser application 116. As such, contention manager logic module 118 uses an alternate contention parameter to select the application that should release its data connection. For example, contention manager logic module 118 may use data traffic, duration of data connection or other indicia as the contention parameter to select the application that should release its data connection. Thereafter, the data connection for the selected application is released and a data connection for email application 110 can be established.

In one implementation, contention manager logic module 118 may consider more than one contention parameter in determining which of the connected applications should release its data connection. For example, in the above case wherein the MCD is currently conducting data sessions for messenger application 114 and browser application 116, then email application 110 requests a data connection, contention manager logic module 118 could sequentially or simultaneously analyze multiple contention parameters such as data traffic and duration of data connection to determine that while the data connection for messenger application 114 has a longer duration, the data traffic associated with that connection warrants that its connection should be maintained. Thus, contention manager logic module 118 selects browser application 116 to release its data connection such that a data connection for email application 110 can be established.

As should be understood by those skilled in the art, contention manager logic module 118 can consider one or any number of contention parameters associated with the connected applications, the data connections associated with the connected applications or other indicia to determine which data connection to release. Likewise, it should be understood by those skilled in the art that contention manager logic module 118 can consider multiple contention parameters simultaneously using a contention parameter formula to weigh the various contention parameters in its determination of which data connection to release. Additionally, it should be understood by those skilled in the art that contention manager logic module 118 can consider multiple contention parameters sequentially using, for example, a contention parameter hierarchy to determine the order of consideration. Further, while contention manager logic module 118 has been described as automatically releasing the data connection of the selected connected application, it should be understood by those skilled in the art that contention manager logic module 118 may prompt the user to acknowledge that the application selected by contention manager logic module 118 should release its data connection.

Figure 4:
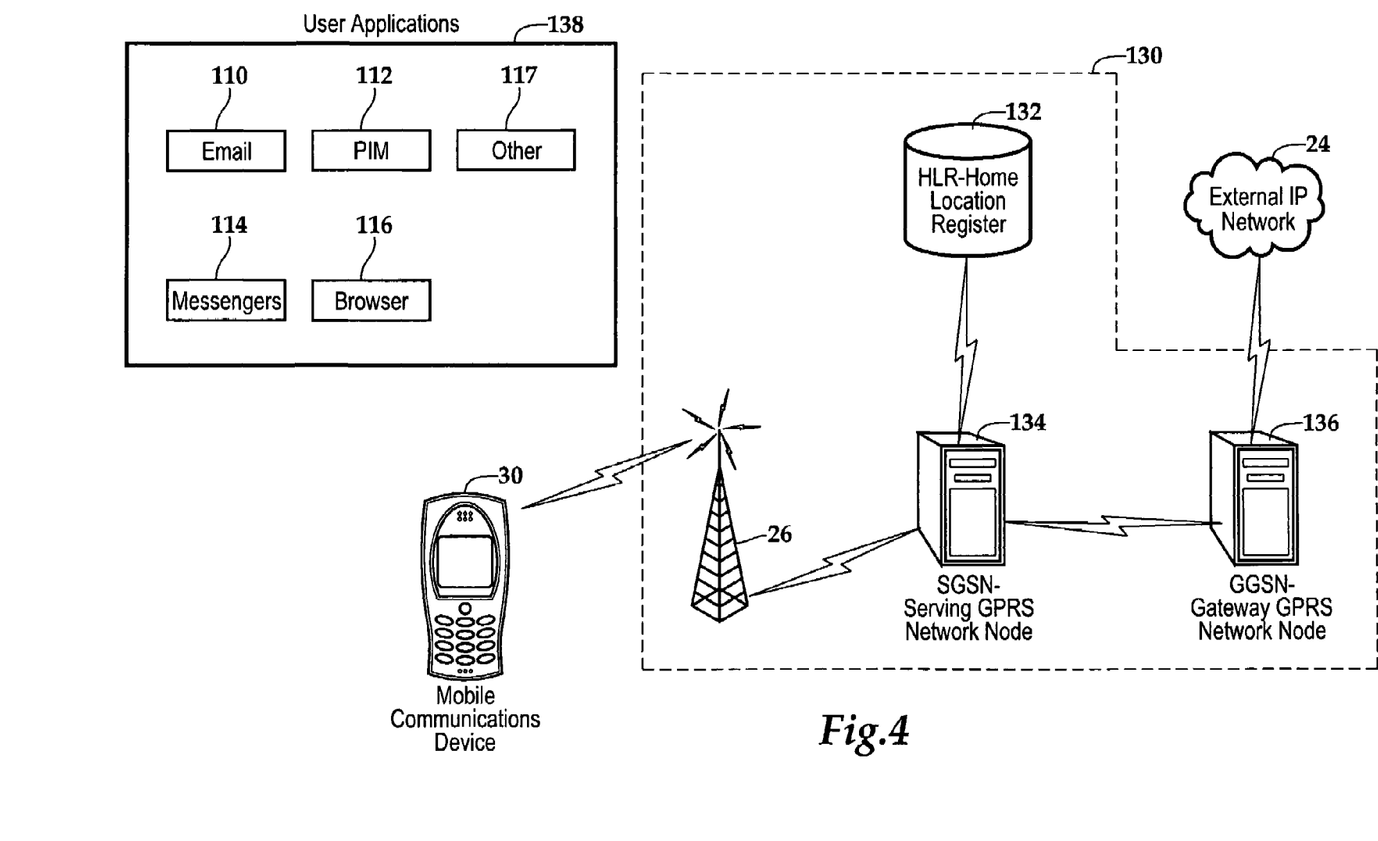
FIG. 4 depicts additional details of an exemplary wireless packet data service network operable with a mobile communications device in accordance with an embodiment of the present disclosure.

FIG. 4 depicts additional details of an exemplary wireless packet data service network operable with a mobile communications device in accordance with an embodiment. As illustrated, reference numeral 130 refers to a GPRS network operable as the wireless packet data service network with respect to MCD 30 that is provided with a number of data-centric user applications 138 such as, e.g., email 110, PIM 112, messenger 114, browser 116 as well as other applications 117 such as multimedia applications, File Transfer Protocol (FTP), telnet and the like. Base station 26 serves MCD 30 via the air interface using applicable radio layer protocols.

GPRS uses a packet-switching technique to transfer both high-speed and low-speed data and signaling in an efficient manner over GSM radio networks. Packet switching means that GPRS radio resources are used only when users are actually sending or receiving data. Rather than dedicating a radio channel to a mobile data user, e.g., MCD 30, for a fixed period of time, the available radio channels can be concurrently shared between several users. Therefore, GPRS is designed to support from intermittent and bursty data transfers (e.g., web browsing) to occasional transmission of large volumes of data (e.g., FTP). Allocation of GPRS radio channels can be flexible: from 1 to 8 radio interface timeslots can be allocated per one Time Division Multiple Access (TDMA) frame. Typically, timeslots are shared by the active users, and uplinks and downlinks are allocated separately. Various radio channel coding schemes are available to allow a range of data bit transfer rates.

Two additional network nodes are provided within a GSM network in order to implement a packet-switched data transfer service. A Serving GPRS Support Node (SGSN) 134, which is coupled to a Home Location Register (HLR) 132 and disposed at the same hierarchical level as a Mobile Switching Center (MSC) of the circuit-switched cellular network, is operably coupled to base station 26 and keeps track of the location of a GPRS user such as the user of MCD 30. Further, SGSN 134 is responsible for performing security functions and handling access control with respect to MCD 30. A Gateway GPRS Support Node (GGSN) 136 provides interworking with the external packet-switched IP network 24, and is operably coupled to one or more SGSNs, e.g., SGSN 134, via an IP-based GPRS backbone network.

In order to access the packet data service, MCD 30 makes its presence known to the network by performing what is known as a GPRS Attach. Thereafter, to send and receive packet data, MCD 30 activates the packet data address that it wants to use. This operation renders MCD 30 "visible" in the corresponding GGSN, and interworking with external data networks can then begin. User data is transferred transparently between MCD 30 and the external data networks with a method known as encapsulation and tunneling wherein data packets are equipped with GPRS-specific protocol information and transferred transparently between MCD 30 and GGSN 136 using, for example, a Packet Data Protocol (PDP) context between MCD 30 and GPRS network 130.

Figure 5:
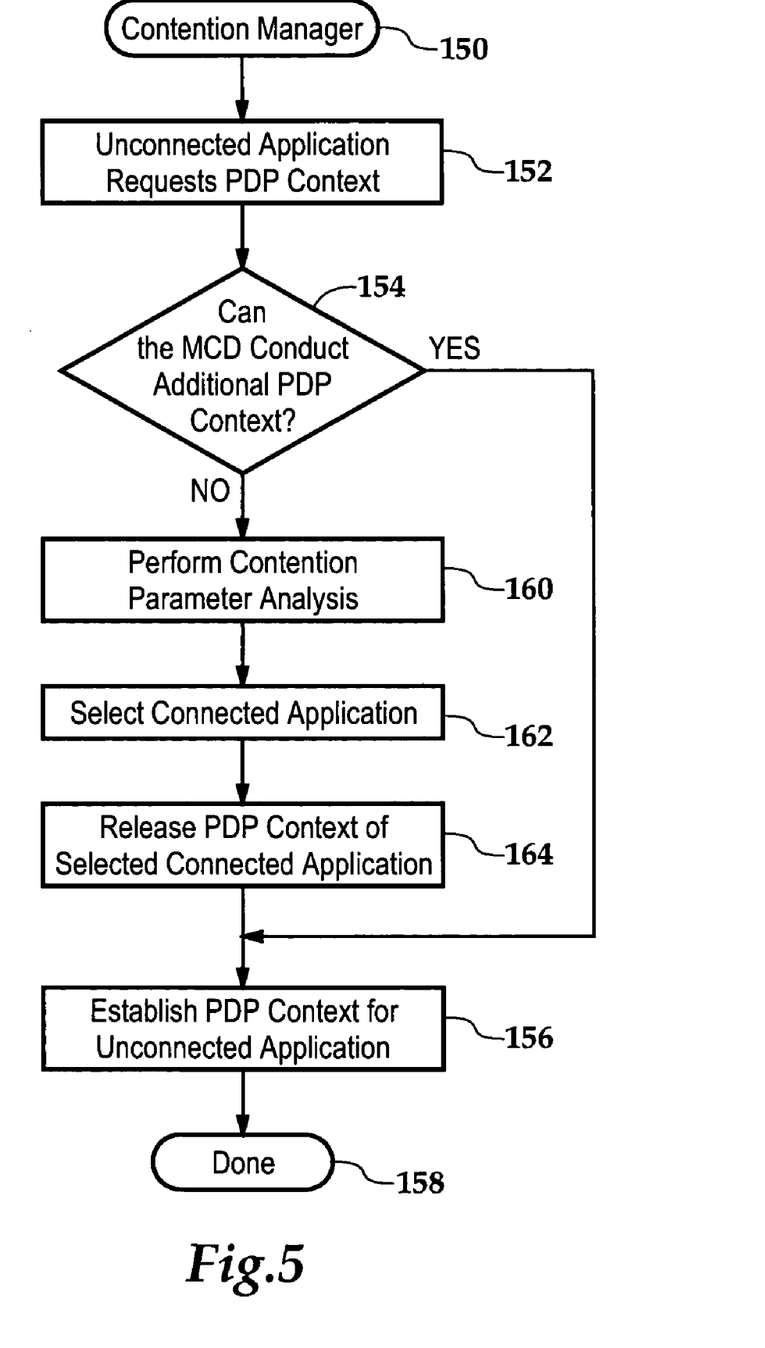
FIG. 5 depicts a flowchart of an embodiment for resolving contention between applications operable on a mobile communications device that require data connections to a wireless packet data service network.

FIG. 5 depicts a flowchart describing a method for resolving contention among applications operable on a mobile communications device that require data connections to a wireless network. The flowchart illustrates a routine referred to as "Contention Manager" (start block 150). This routine is called when an unconnected data application operable on the MCD is opened and requests a PDP context (block 152). Upon the request, it is determined whether the MCD is capable of conducting an additional PDP context associated with the unconnected data application (decision 154). If the MCD is capable of conducting an additional PDP context associated with the unconnected data application, then a PDP context is established for the unconnected data application between the MCD and the wireless network (block 156) and the routine in complete (end block 158). If at decision 154 the MCD is not capable of conducting an additional PDP context associated with the unconnected data application, then the contention manager performs an analysis of the contention parameter associates with the connected applications, the PDP contexts associated with the connected applications or both (block 160). Based upon the results of the contention parameter analysis, the contention manager selects the connected application that should have its PDP context released (block 162). The PDP context of the selected connected application is released (block 164). A PDP context is then established between the MCD and the wireless network for the unconnected data application (block 156) and the routine in complete (end block 158). As stated above, in certain implementations, prior to releasing the PDP context of the selected application, the user of the MCD may be prompted to acknowledge that such PDP context should be released.

While this disclosure has described a mobile communications device operating within a network system with reference to illustrative embodiments, this description is not intended to be construed in a limiting sense. Various modifications and combinations of the illustrative embodiments as well as other embodiments, will be apparent to persons skilled in the art upon reference to the description. It is, therefore, intended that the appended claims encompass any such modifications or embodiments.

What is claimed is:

1. A method for resolving contention among applications operable on a mobile communications device that require data connections to a wireless network, the method comprising:
   conducting at least two data connections between the mobile communications device and the wireless network, each of the data connections associated with a connected application operating on the mobile communications device;
   requesting a data connection for an unconnected application operable on the mobile communications device;
   releasing one of the data connections responsive to the request, the releasing including selecting one of the connected applications by a contention manager based upon a comparison of first and second contention parameters associated with each of the connected applications and releasing the data connection associated with the selected connected application; and
   establishing the data connection between the mobile communications device and the wireless network for the unconnected application.

2. The method as recited in claim 1 wherein the step of conducting at least two data connections between the mobile communications device and the wireless network further comprises conducting the maximum number of data connections allowed by the mobile communications device.

3. The method as recited in claim 1 wherein the step of conducting at least two data connections between the mobile communications device and the wireless network further comprises conducting the maximum number of data connections allowed between the mobile communications device and the wireless network.

4. The method as recited in claim 1 wherein each of the applications further comprises an application requiring constant connectivity.

5. The method as recited in claim 1 wherein the step of releasing one of the data connections responsive to the request further comprises comparing the first contention parameters prior to comparing the second contention parameters.

6. The method as recited in claim 1 wherein the step of releasing one of the data connections responsive to the request further comprises comparing data traffic associated with the data connections of the connected applications to determine the selected connected application.

7. The method as recited in claim 1 wherein the step of releasing one of the data connections responsive to the request further comprises comparing a duration of connection associated with the data connections of the connected applications to determine the selected connected application.

8. A mobile communications device comprising:
a wireless transceiver operable to conduct at least two data connections between the mobile communications device and a wireless network, each of the data connections associated with a connected application operating on the mobile communications device;
a processor coupled to the wireless transceiver and operable to process a request for a data connection for an unconnected application operable on the mobile communications device, to release one of the data connections associated with one of the connected applications and to establish a data connection between the mobile communications device and the wireless network for the unconnected application; and
a contention manager operable to select the connected application to be released based upon a comparison of first and second contention parameters associated with each of the connected applications.

9. The mobile communications device as recited in claim 8 wherein the data connections between the mobile communications device and the wireless network further comprise a maximum number of data connections allowed by the mobile communications device.

10. The mobile communications device as recited in claim 8 wherein the data connections between the mobile communications device and the wireless network further comprise a maximum number of data connections allowed between the mobile communications device and the wireless network.

11. The mobile communications device as recited in claim 8 wherein each of the applications further comprises an application requiring constant connectivity.

12. The mobile communications device as recited in claim 8 wherein the contention parameter associated with each of the connected applications further comprises an application priority associated with each of the connected applications.

13. The mobile communications device as recited in claim 8 wherein the second contention parameters are compared only if the conflict cannot be resolved by comparison of the first contention parameters.

14. The mobile communications device as recited in claim 8 wherein the contention parameter associated with each of the connected applications further comprises a duration of the data connection associated with each of the connected application.

15. A computer readable medium encoded with computer instructions, comprising:
computer instructions executable by a processor of a mobile communications device operable to conduct at least two data connections with a wireless network, each of the data connections associated with a connected application operating on the mobile communications device, the computer instructions for resolving contention among applications operable on the mobile communications device by:
receiving a request for a data connection for an unconnected application operable on the mobile communications device;
selecting one of the connected applications based upon a comparison of first and second contention parameters associated with each of the connected applications;
releasing the data connection associated with the selected connected application; and
establishing the data connection between the mobile communications device and the wireless network for the unconnected application.

16. The computer readable medium as recited in claim 15 wherein the data connections between the mobile communications device and the wireless network further comprise a maximum number of data connections allowed by the mobile communications device.

17. The computer readable medium as recited in claim 15 wherein the data connections between the mobile communications device and the wireless network further comprise a maximum number of data connections allowed between the mobile communications device and the wireless network.

18. The computer readable medium as recited in claim 15 wherein each of the applications further comprises an application requiring constant connectivity.

19. The computer readable medium as recited in claim 15 wherein selecting one of the connected applications further comprises comparing the application priority associated with the connected applications to determine the selected connected application.

20. The computer readable medium as recited in claim 15 wherein selecting one of the connected applications further comprises comparing data traffic associated with the data connections of the connected applications to determine the selected connected application.

21. The computer readable medium as recited in claim 15 wherein selecting one of the connected applications further comprises weighing the first and second contention parameters simultaneously in a contention parameter formula.

* * * * *